April 21, 1970    C. J. BRYAN    3,507,234
WAISTBAND END FINISHING APPARATUS AND METHOD
Filed Oct. 17, 1967    5 Sheets-Sheet 1

INVENTOR.
CARNEY J. BRYAN
BY attorney

April 21, 1970 C. J. BRYAN 3,507,234
WAISTBAND END FINISHING APPARATUS AND METHOD
Filed Oct. 17, 1967 5 Sheets-Sheet 3

INVENTOR.
CARNEY J. BRYAN
BY attorney

INVENTOR.
CARNEY J. BRYAN

BY attorney

INVENTOR.
CARNEY J. BRYAN
BY attorney

United States Patent Office 3,507,234
Patented Apr. 21, 1970

3,507,234
WAISTBAND END FINISHING APPARATUS AND METHOD
Carney J. Bryan, Greensboro, N.C., assignor to Blue Bell, Inc., Greensboro, N.C., a corporation of Delaware
Filed Oct. 17, 1967, Ser. No. 675,946
Int. Cl. D05b 23/00
U.S. Cl. 112—121.27                                    11 Claims

ABSTRACT OF THE DISCLOSURE

An apparatus for inverting a portion of a garment waistband having opposed fabric plies and an open free terminal end portion comprising means for releasably clamping and spreading the fabric plies of the waistband apart in spaced relation to the terminal end portion of the waistband and means for inverting the free end portion of the waistband into the waistband by inverting the free end portion to form a finished inturned edge. A waistband supporting member in juxtaposition to the clamping and spreading means supports the waistband for positioning a turned waistband in a directed predetermined path of travel to a sewing machine for seaming.

A method of edge finishing a garment waistband by drawing the free terminal end of a waistband and at least a portion of a waistband on a supporting member, thereafter gripping opposite sides of the supported waistband in spaced relation to the free terminal end, and tucking the free end of the waistband back in itself into at least the gripped portion of the waistband.

BACKGROUND AND OBJECTIVES OF INVENTION

The garment industry has for many years relied upon manual operation in the fabrication of garments with negligible advancements being made in automation and machinery to reduce costs, improve quality and uniformity, and to increase production. Numerous manual operations necessary for end finishing waistbands in garments such as pants, skirts, and shorts provide troublesome and tedious operations with negligible advances having been made in this technology. Presently, an elongated section of fabric may be folded lengthwise and seamed to form a band with opposed fabric plies that are secured to a garment with the end or terminal portions that are unfinished extending beyond the garment. The free terminal end portions must be manually turned inwardly by an operator through a manipulation of the end portion being tucked inwardly or inverted into the secured portion of the waistband in order to form a coincident finished edge preparatory for seaming on a sewing machine. The tedious manual operations that are required to form a finished inturned edge that will align with other sections of the garment have resulted in production bottleneck problems particularly in the manufacture of medium and low-price trousers, work pants, dungarees, sport clothes, among other apparel in which a waistband or comparable end finishing is required.

Accordingly, an objective of this invention is to provide an end finishing apparatus and method to facilitate the closing of the open end of a waistband.

Another objective of this invention is the provision of an apparatus for inverting the free end of a waistband preparatory for end finishing.

Yet another objective of this invention is to provide an apparatus that will automatically invert the terminal free end of a waistband and form an aligned finished edge preparatory for edge seaming.

Still another objective is the provision of an apparatus for supporting a garment while the free end portion is inverted to form a finished edge and converying the waistband and garment to a sewing machine for final edge seaming.

This invention further contemplates a method of edge finishing of waistbands in which an unfinished waistband having a free terminal end is supported while the end is tucked inwardly into the band to provide a finished end to be seamed closed in subsequent band finishing seaming operations.

The apparatus and method of this invention minimizes garment handling, improves the quality of waistband end finishing with increased uniformly seamed ends that are equal or superior to that which is achieved by present tedious manual operations.

BRIEF DESCRIPTION OF APPARATUS AND METHOD

The apparatus for achieving the objectives of this invention includes a waistband impaling tongue means on which the open free terminal end of a tubular waistband is supported. A waistband gripping and spreading mechanism releasably clamps and spreads the fabric plies of the impaled waistband with the gripping action being positioned in spaced relation to the terminal free end of the band leaving a free end portion for insertion or tucking into the band by inverting it. The releasable clamping and spreading means operate sequentially for engaging, clamping, spreading and releasing opposite sides of the fabric waistband with a waistband inverting means being projected when the waistband fabric plies are spread to insert the free terminal end into the waistband forming a finished edge at a predetermined position in alignment with another portion of the garment. An impaling tongue conveying means is sequentially actuated to displace the tongue impaling means along a directed path of travel to position a waistband supported thereon toward a releasable clamping member in juxtaposition to a sewing machine for cooperatively and releasably receiving the waistband impaling member. Upon positioning the waistband for seaming, the impaling member is removed and the sewing machine is actuated to seam the waistband end closed.

The method for end finishing a waistband comprises the steps of drawing the free terminal end of a waistband, usually supported on a garment, on a supporting member to a predetermined position and thereafter gripping opposite sides of the supported waistband in spaced relation to the free terminal end of the waistband. The free end of the waistband is tucked or inverted into at least the gripped portion of the waistband while it is supported on a supporting member to form a finished edge. The finished edge of the waistband is then fed to a sewing machine for edge seaming after the waistband supporting member is removed.

DESCRIPTION OF DRAWINGS

Many additional objectives and advantages of this novel apparatus and method will become more readily apparent from the following drawings which illustrates only a single preferred embodiment, without any limitations being intended, in which like characters of reference designate corresponding parts throughout the several views, and wherein.

DETAILED DESCRIPTION OF APPARATUS AND METHOD

Figure 8A:
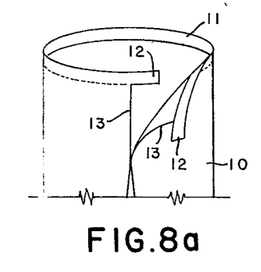
FIGS. 8a, 8b and 8c schematically and sequentially illustrate the sequence of operations performed on a garment supported waistband.
Figure 8B:
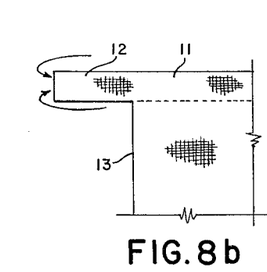
Figure 8C:
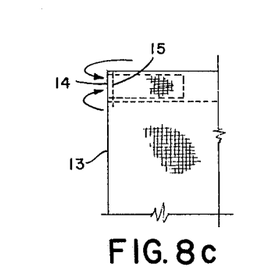

For the purpose of this description and specification, and without any limitations intended, a "waistband" for a garment generally consists of at least two fabric plies positioned adjacent each other secured to form a substantially flat-open end tube. As illustrated in FIGS. 8a through 8c, a garment 10 is provided with a waistband 11 in which there are at least two plies of fabric contiguous to each other with the waistband in a finished garment being stitched securely to the garment along the lower edge of the band. In the fabrication of the waistband 11, predetermined lengths of fabric are cut and seamed along the free edges and ultimately sewn to a garment substantially as shown in FIG. 8a. Freely extended open terminal end portions 12 extend from the finished garment edges 13 whether the edge of the garment is for a fly front or side of a garment. The free open ends are inverted or tucked inwardly, referred to herein as "inverting" or "tucking" into the attached edge of the waistband and inverted sufficiently to permit the formation of a finished aligned edge 14 is shown in FIG. 8c for alignment or spaced alignment with the finished garment edge 13 preliminary to a final seaming 15 to form the finished end of the garment waistband. The apparatus provided will support a portion of the waistband 11 that includes the free terminal end portion 12, and means is provided to invert the free terminal end portion 12 inwardly into the secured portion of the waistband to provide the finished edge 14 preliminary to sewing to form the stitching 15 that will be performed on a sewing machine preferably.

There is illustrated in FIGS. 1 through 4 a preferred embodiment of a waistband end finishing machine 16 that is supported on the machine framework 17 mounted on the vertically adjustable legs 18 with the basic machine being provided with independently operable left operation section 19 and right operating section 20 each of which is adapted to receive, invert and position a waistband with a depending garment to a sewing machine 21 that is positioned between the sections 19 and 20 for sewing the finished waistband end closed. For the purpose of this description, only the right section 20 will be described in detail as it will be readily understood that the left section 19 is constructed and operates in substantially the same manner as section 20 except for a reorientation of the mechanism and components for functioning in sequential operation with the right section. Although only a single sewing machine 21 is illustrated, individual sewing machines may be employed for each section.

Specific reference will be made to various mechanisms and motions including (a) waistband impaling tongue and conveying mechanism, (b) waistband releasable clamping and spreading mechanism, (c) waistband inverting mechanism, (d) waistband stripping attachment and sewing machine, (e) electrical system, and (f) sequential operation.

(a) Waistband impaling tongue means and conveying mechanism

Figure 3:
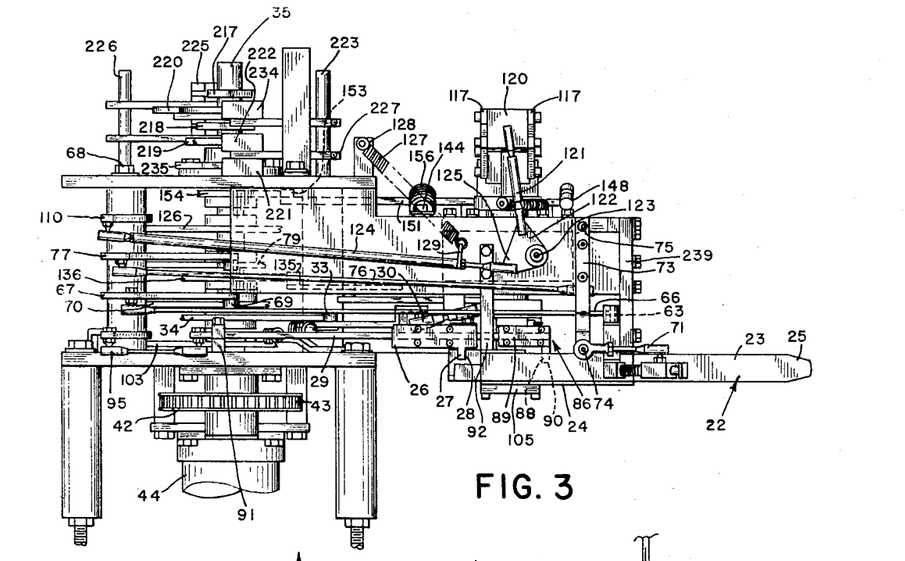
FIG. 3 is a left partial elevational view of FIG. 2.

Each of the sections 19 and 20 is provided with a waistband impaling tongue means 22 that is guidably supported for horizontal reciprocation in which a flat waistband impaling tongue 23 is guidably supported in the tongue and inverter housing 24 with the cantilever projecting tongue 23 being provided with a rounded converging or tapered end 25 which facilitates threading and impaling the free terminal end of a waistband thereon for support with the waistband being positioned on the tongue 23 for a predetermined length preferably. Tongue 23 extends rearwardly through housing 24 for releasable clamping engagement by the slidable cleat 26 on which there is a downwardly extending pawl 27 for cooperatively engaging into the tongue pawl-receiving recess 28 with the cleat 26 being guidably movable between limits on the inverter bar 29 as shown in FIG. 3. Cleat 26 is pivotally linked to the cleat activating rod 30 at one end thereof with the other end being secured to the tongue actuating lever 31 that is pivotally supported on the vertical lever shaft 32 with the lever 31 being provided with a cam follower 33 for engaging the tongue actuating cam 34 mounted for rotation on cam supporting shaft 35 with lever 31 being urged to engage cam 34 through cam follower 33 by means of the helical spring 36 fastened at one end 37 to the spring fastening plate 38 secured to the frame mounted stud 39 and the other spring end 40 being secured to spring link 41 that is secured to cam follower 33. Tongue actuating cam 34 is provided with suitably timed actuating, dwell and retraction lobes (not shown) depending upon the desired sequence for projecting and withdrawing impaling tongue 23 during the sequence of operations to be described hereafter.

Figures 2, 5:
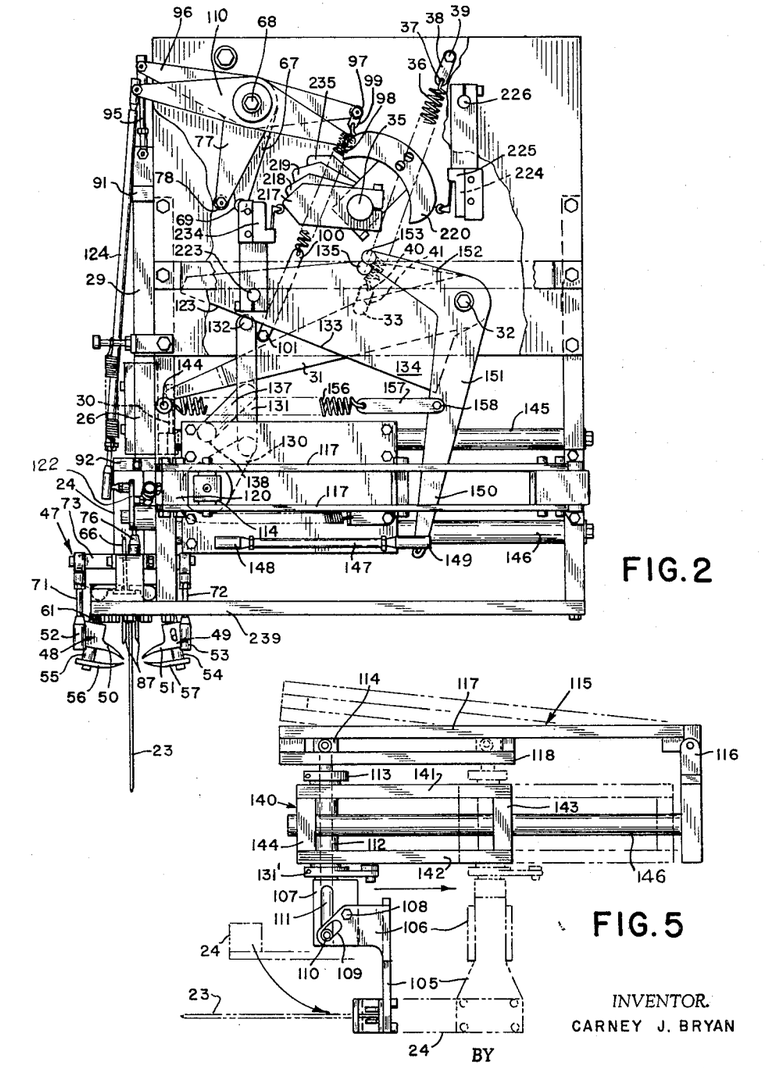
FIG. 2 is a partial, enlarged, top plan view, with sections removed, of the right-hand side of the apparatus shown in FIG. 1 preparatory for receiving a waistband and garment.
FIG. 5 is an enlarged top plan view of the waistband impaling tongue member and conveying mechanism.
Figure 9A:
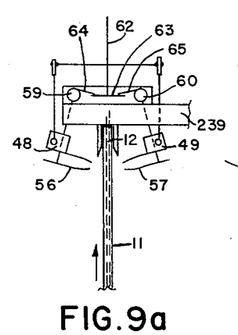
FIGS. 9a through 9k illustrate schematically and sequentially the operations performed on a waistband from commencement to completion of one cycle to form a finished end on a waistband.

In the initial waistband receiving position shown in FIGS. 2, 3 and 9a, impaling tongue 23 is projected in the forward position for receiving and supporting a waistband free terminal end portion 12 and a portion of waistband 11 thereon.

Cam shaft 35 is vertically journaled in the machine frame and supports chain sprocket 42 thereon with chain 43 driving the sprocket 42 from the gear motor 44. At a predetermined interval after a waistband is positioned on the impaling tongue 23, the tongue with the waistband impaled on it will be retracted as lever 31 is pivoted in a clockwise direction about lever shaft 32 moving cleat 26 rearwardly as shown in FIG. 2 drawing impaling tongue 23 with it to slide the tongue and withdraw it partially from the waistband as illustrated in the sequence shown in FIGS. 9a through 9d before the tongue 23 is reinserted into an inverted waistband as schown in FIGS. 9e and 9f.

(b) Waistband releasable clamping and spreading mechanism

Figure 9B:
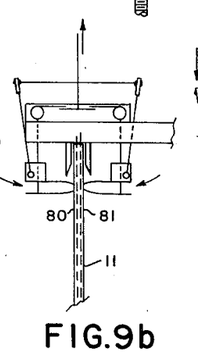
Figure 9C:
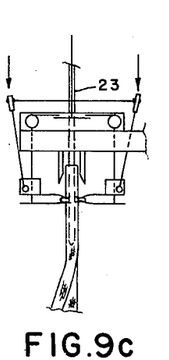
Figure 9D:
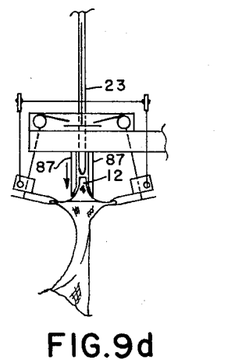
Figure 9E:
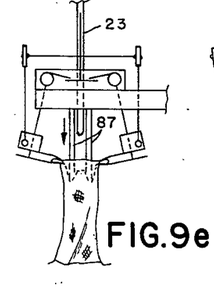
Figure 9F:
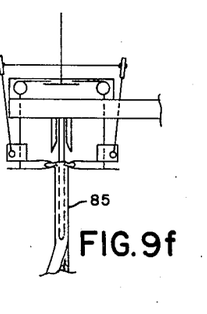
Figures 9G, 9H, 9I, 9J, 9K:
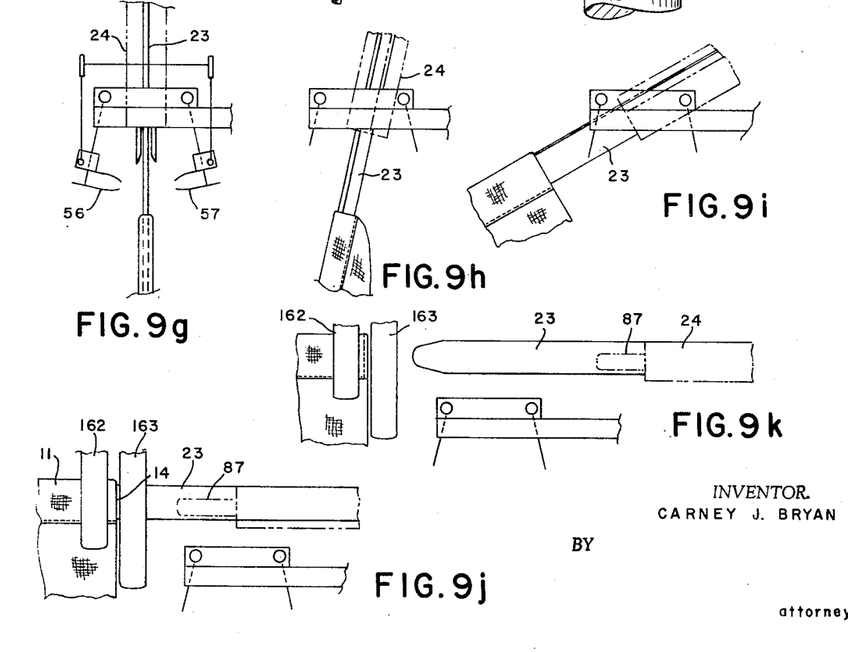

A waistband clamping and spreading mechanism 47 is positioned adjacent and in juxtaposition to the waistband impaling tongue member 23 with opposed pivotable fabric clamping members 48 and 49 being positioned on opposite sides of the tongue member 23 and in spaced relation thereto in the tongue projected position as shown in FIGS. 2 and 3. Each of the clamping members 48 and 49 is provided with a lower pivotally mounted jaw 50 and 51 pivotally mounted to the lower jaw connecting rod 52 and 53 with each of the lower jaws 50 and 51 being provided with a guide channel for slidably receiving and supporting the upper jaw supporting bar 54 and 55 at the free end of which is mounted an upper jaw clamp member 56 and 57 for each of the clamping members 48 and 49. Each of the supporting bars 54 and 55 extend through the lower jaws 48 and 49 for pivotal connection with a pivot pin 59 and 60 secured to the machine frame as shown in the schematic representation in FIGS. 9a and 9b. A helical spring 61 encircling bar 55 on clamp 48 (and a separate spring that is not shown encircles bar 54 on clamp 49) yieldably biases or urges the lower jaw 50 toward the upper jaw 56. The jaw-actuating plunger rod 62 with its connected base 63 engages the separately extending arms 64 and 65 that are connected to the bars 54 and 55 about the pivot pins 59 and 60 to displace the jaws 48 and 49 from the inoperative open position shown in FIGS. 2 and 9a to the waistband engaging operative position shown in FIG. 9b. The horizontally extending jaw activating rod 66 is connected at one end to the rod 62 and at the other end to the jaw actuating lever 67 mounted on the lever shaft 68 with the free end of the pivotable lever 67 being provided with cam follower 69 for engaging the perimeter of the jaw actuating cam 70 mounted for rotation on cam shaft 35. The fabric gripping or clamping action of the jaws 48 and 49 is provided by the jaw clamping movement of the lower jaws 50 and 51 sliding on their respective bars 54 and 55 upon displacement of the lower jaw connecting rods 71 and 72 each of which is connected to the lower jaws 48 and 49 respectively at one end of each rod with the other end of the rods 71 and 72 being connected to the lower end of the pivotally supported lower jaw actuating bar 73 through a pivotal connection 74 therewith with the upper end of bar 73 being pivotally secured through a pivotal connection 75 with the frame of the machine. The lower jaw actuating bar is connected intermediate its length to the lower jaw actuating rod 76 at one end thereof with the other end being pivotally connected to the lower jaw actuating rod lever 77 that is pivotally mounted on the lever shaft 68. The free end of lever 77 is provided with a cam follower for engaging the lower jaw actuating cam 79 mounted on the cam shaft 35. After presentation of the jaws 48 and 49 to fabric engaging position as shown in FIG. 9b, the lower jaws 50 and 51 will be urged toward the upper jaws 56 and 57 upon actuation of the lower jaw actuating lever 77, lower jaw actuating rod 76, lower jaw actuating bar 73 and the connected lower jaw rods 71 and 72 to pinch and clamp a limited portion of opposed fabric plies 80 and 81 of the waistband 11 at a predetermined spaced position. As illustrated in FIG. 9c, the upper and lower jaws clamp a short reach of the fabric plies 80 and 81, and after the clamping actuation occurs, the upper jaw actuating cam through its connecting linkages will displace member 62 and its base 63 to permit the jaws 48 and 49 to pivot about the pivot pins 59 and 60 while the upper and lower jaws clamp opposite plies of fabric of the waistband thereby spreading the waistband as the impaling tongue member 23 is withdrawn at least partially from within the waistband 11 and the free terminal end portion 12 as shown in FIG. 9d. After inverting the free terminal end portion 12 of the waistband, the rod 62 and base 63 will pivot the jaws 48 and 49 inwardly while the fabric plies are still gripped or clamped permitting the tongue impaling member 23 to be reinserted into the turned waistband as shown in FIG. 9f. When the tongue impaling member 23 is fully inserted in the turned waistband 85, the jaws 48 and 49 will release the clamped fabric as the lower jaw actuating cam 79 and its related linkages return the lower jaws 50 and 51 to the initial lower jaws 50 and 51 to the initial position as shown in FIGS. 2, 9a and 9g. While the member 62 and its related base are actuated by the upper jaw actuating cam 70 and its related linkages thereby pivoting the bars 54 and 55 to their original position.

(c) Waistband inverting mechanism

After a waistband 11 is impaled on the tongue member 23 and the fabric plies releasably clamped and spread apart as described above and as shown in FIG. 9d, a waistband inverting mechanism 86 tucks or inverts the free terminal end portion 12 of the waistband in the waistband 11 by means of a pair of laterally spaced apart inverting blades 87 that are positioned closely adjacent the vertical sides of impaling tongue member 23. The inverter blades 87 are slidably positioned in the housing 24 and extend rearwardly to be engaged releasably by the depending pawl 88 extending from the blade actuating cleat 89 that is secured to the blade actuating bar 29. Bar 29 is bearingly supported in the spaced-apart bearings 91 and 92 with the depending pawl 88 being cooperatively received in a pawl-receiving recess 90 in the rear supported portion of each inverter blade 87. The blade actuating bar 29 is connected at its other end to the pivotal link 95 with the other end of the link 95 being pivotally secured to the inverter blade actuating lever 96 which is pivotally mounted on the lever shaft 68 with the cam follower roll 97 being urged by the helical spring 98 that is connected to the spring fastening member 99 adjacent the follower 97 and the spring connecting link 100 that is fastened to the machine frame stud 101 for urging the follower 97 into engagement with the blade actuating cam 103 mounted on the cam shaft 35. As the fabric clamping jaws 48 and 49 releasably clamp and spread the plies of fabric in the waistband as shown in FIG. 9d, and the impaling tongue member 23 is at least partially retracted, the forward tapered ends of the inverting blades 87 will be projected forwardly to engage the free terminal end portion 12 of the waistband to invert or tuck it inwardly as sequentially illustrated in FIGS. 9d and 9e. The inverter blades will be retracted, as shown in FIG. 9f, after the tongue member 23 is reinserted into the end turned waistband 85 as shown in FIG. 9f. It will be readily apparent that while two blades are illustrated, a single U-shaped member or a member encircling the tongue member 23 may be utilized.

(d) Waistband stripping attachment and sewing machine

Figure 1:
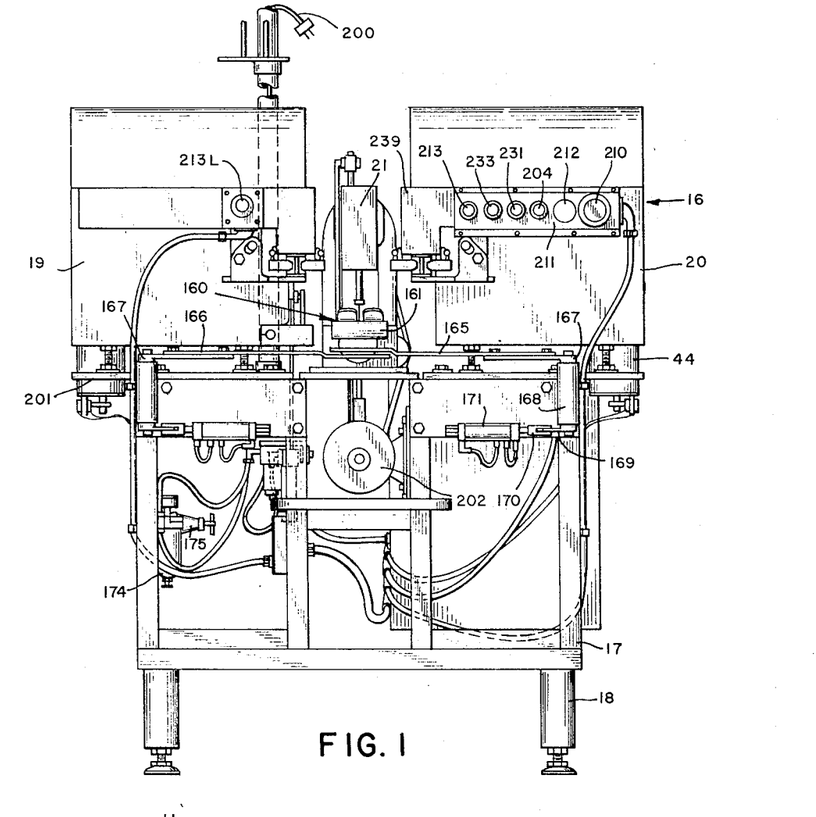
FIG. 1 is a front elevational view of an apparatus for end finishing a waistband embodying the invention.
Figure 4:
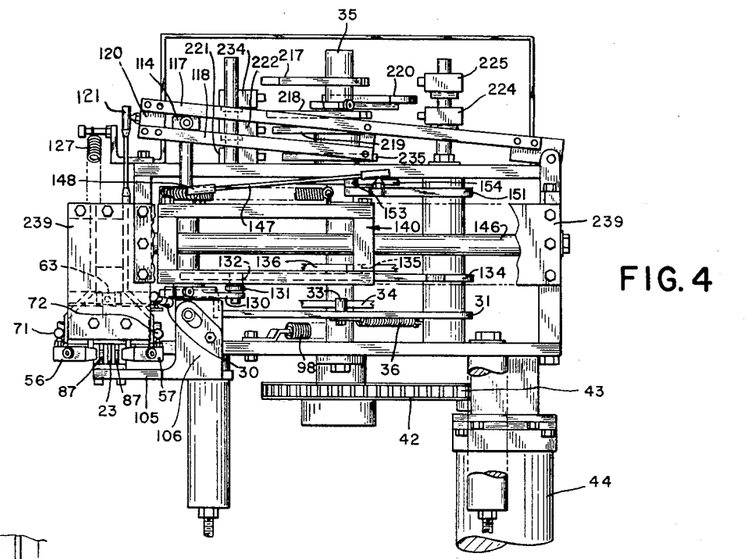
FIG. 4 is a partial front elevational view, with portions removed, of FIGS. 2 and 3.

Once the free terminal end portion 12 of the waistband is inverted to form the desired finished edge, the garment may be removed for subsequent operations or, as is provided in this machine, the waistband, while it is supported, may be conveyed to have the inverted waistband stitched closed along the finished edge either in alignment or in spaced alignment to another section of the finished garment. It will be readily apparent that either the sewing machine may be displaced toward the finished garment or the finished garment transported along a directed path of travel to a sewing machine while it is still supported on the waistband impaling tongue member 23. In the preferred embodiment, the sewing machine 21 is positioned between left and right sections 19 and 20 necessitating a conveying mechanism for translating the waistband supporting tongue member 23 to a position in relation to the sewing machine for stripping the waistband from the tongue member 23. The sewing machine 21 is provided with the necessary presser foot and sewing instrumentalities of conventional construction. As shown in FIGS. 1, 3 and 4, the impaling tongue member 23 and the inverter blades 87 which are positioned and retained for slidable movement in the housing 24 that is independently supported to retain the tongue member 23 and blades thereon may be disengaged from the depending paws 27 and 88.

Housing 24 is provided with a base plate 105 that extends horizontally from the supporting yoke 106 which is pivotally mounted to the collar 107, as best illustrated in FIG. 5, about the pivot pin 108 with the supporting yoke being provided with pivot-pin-receiving slots 109 on opposite sides of the yoke 106 through which slots a yoke-pivoting pin 110 passes from the pin supported vertical plunger 111. Plunger 111 extends vertically through the bearing sleeve 112 and collar 113 to the plunger crosshead 114 positioned for transverse displacement and vertical reciprocation in the housing conveyor carriage assembly 115 which is pivotally mounted to the machine frame through the supported clevis joint 116. The carriage assembly 115 is provided with laterally spaced-apart parallel pairs of upper and lower rails 117 and 118 cooperatively to receive the cross-head 114 for slidable movement therebetween with the assembly 115 being positioned in the inclined inactive or upper position during waistband inverting at the home position.

The free end 120 of the assembly 115 is connected to the bell crank connecting arm 121 that is supported at the other end to the bell crank 122, as shown in FIG. 3, which is pivotally mounted about the bell crank pivot pin 123 secured to the machine frame. The carriage actuating rod 124 is connected to the downwardly extending portion 125 of the bell crank 122 with the other end being connected to the carriage actuating lever 110 that is pivotally mounted on the lever shaft 68. The free end of lever 110 is provided with a cam follower (not shown) to engage the periphery of the carriage assembly actuating cam 126 mounted on the cam shaft 35. The helical spring 127 is secured at one end to the bracket lug 128 extending from the machine frame, and the other end is secured to the spring-retaining member 129 positioned on the carriage actuating rod 124 with the spring 127 urging the assembly 115 to be retained in the elevated position until actuated to the lowered operating position by the carriage actuating cam 126.

When the carriage actuating cam 126 actuates the connecting linkages to lower the carriage assembly 115, plunger 111 will be slidably depressed and the pin 110 will pivot the yoke 106 in a counterclockwise direction about the pivot pin 108 as shown in FIG. 5. It will be readily apparent that the conveying and displacement of the carriage assembly in a directed path of travel will be dependent upon the location and position of the sewing machine platform for receiving the waistband to be sewn. Also, it is contemplated that a sewing machine may be displaced relative to the tongue member 23 for receiving a finished waistband end for sewing.

To receive rotation of the housing 24 and the yoke base 106, with its supporting collar 107, a crank arm 130 with a sleeve-encircling collar 131', as shown in FIG. 5, is secured to sleeve 112 with the free end of arm 130 being pivotally secured to the crank arm actuating bar 131. The free end of bar 131 is provided with a lever arm follower 132 for engaging the lever arm edge 133, see FIG. 2, of lever arm 134 that is pivotally mounted on the lever shaft 32. Displacement of lever arm 134 is controlled through the lever arm actuating cam follower 135 that engages the periphery of the rotatable lever arm actuating cam 136 supported on the cam shaft 35. A constraining guide bar 137 is fastened at one end to the machine frame pivot pin 138 with the free end of the guide bar 137 being pivotally secured to the bar 131 intermediate its length thereby providing constraining substantial rectilinear displacement of bar 131 for rotating or pivoting crank arm 130 and sleeve 112 to which the arm 130 is clamped for the desired rotational angle, as best illustrated in FIGS. 4 and 5.

Lateral displacement of the housing 24, base plate 105 and supporting yoke 106 is achieved by means of the slidable housing carriage assembly 140 in which a pair of upper and lower plates 141 and 142 is retained in spaced parallel relation by being secured to the end plates 143 and 144 with the entire carriage assembly 140 being slidably positioned to a lateral displacement on the parallel spaced-apart guide bars 145 and 146 that are mounted to the machine frame with the rails straddling the plunger sleeve 112. The upper and lower plates 141 and 142 are provided with suitable sleeve-receiving openings to support cooperatively the sleeve 112 on which the supporting collar 113 is positioned. Rectilinear displacement of the slidable carriage assembly 140 is achieved by means of the actuating rod 147 that is connected at one end 148 to the carriage assembly 140 with the other end 149 being connected to the long arm 150 of the bell crank 151 pivotally mounted on the lever shaft 32. The short arm 152 of bell crank 151 has a cam follower 153 at its free end for engaging the slidable carriage assembly actuating cam 154 which is mounted to rotate on the cam shaft 35.

The slidable carriage assembly 140, when actuated, slides from the left position shown in FIGS. 4 and 5 to the right position shown in outline form in FIG. 5 thereby displacing the housing 24 and yoke 106 while the housing is rotated ninety degrees both in a vertical and a horizontal direction. Slidable carriage assembly 140 is normally urged to the left as shown in FIGS. 2, 4 and 5 by means of helical spring 156, fastened at one end to the machine frame and the other end to the spring-connecting link 157 secured to the bell crank arm 150 by the pin 158. After the garment stripping operation, to be described hereafter, when the slidable carriage assembly 140 is in the right side stripping position shown in outline form in FIG. 5, the carriage assembly will return to its home position aided by the spring 156.

There is illustrated in FIGS. 1, 9h and 9k, a waistband stripping means 160 in which the platform 161 that is positioned in alignment with the base of the sewing machine will cooperatively receive a waistband and garment conveyed to it by the impaling tongue member 23. A pair of laterally spaced-apart stripping bars 162 and 163 are positioned to extend in juxtaposition to the base plate or platform 161 to permit the tongue member 23 with a supported waistband thereon to be inserted between the platform 161 and beneath the stripping members 162 and 163 as shown in FIG. 9j with the waistband turned edge 14 being positioned between the adjacent edges of members 162 and 163. As the impaling tongue member 23 is slidably retracted or withdrawn from the waistband 11, during lateral displacement of the slidable carriage assembly 140, sufficient resistance of the waistband from sliding is exerted by stripping member 162 or 163, depending upon the direction of tongue member 23 withdrawal, whether from the right or left sections. In the event the waistband 11 is displaced slightly, it will abut the adjacent edge of one or the other of the stripping members 162 or 163 as the tongue member 23 is extracted preliminary to actuation of the sewing machine 21.

When the garment 10 is conveyed from the waistband inverting position to the sewing machine, the garment will be draped over the horizontally extending garment supporting arms 165 or 166, one for each section, with each arm extending inwardly horizontally from the arm supporting shaft 167 that is pivotally supported in the frame-mounted shaft-receiving socket 168 with the lower end of the shaft 167 being provided with an ejector actuating crank arm 169 fastened to the free end of the air cylinder piston rod 170 that extends from the air cylinder 171. When actuated, the arm 169 will pivot the garment supporting and ejector arm 165 from a position substantially parallel to the front of the machine in the garment-supporting position to a position substantially at right angles to the machine permitting the draped garment with a finished and sewn turned edge at the waistband to be stacked one upon another.

Figure 7:
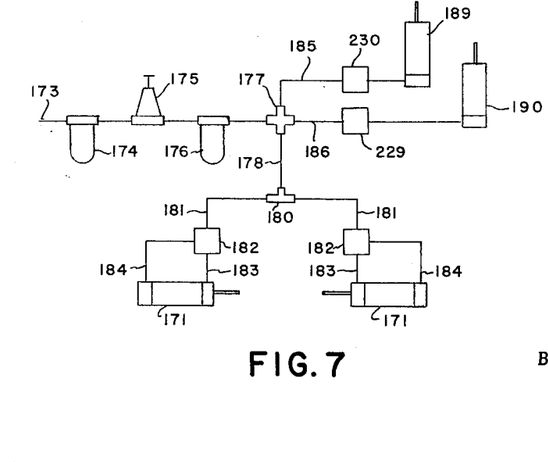
FIG. 7 is a schematic diagram of the pneumatic system incorporated on the apparatus.

In FIG. 7, there is schematically illustrated the pneumatic system in which air under pressure will flow through line 173 passing through filter 174, pressure regulator 175 and oiler 176 to the cross fitting 177 which diverts the air under pressure to the lines 178, 185 and 186. Line 178 conveys air through fitting 180 and lines 181 to the individually operated ejector arm actuating cylinders 171 upon actuation of the air control valves 182 in each line that control air passage to either end of the cylinders 171 through the lines 183 and 184. Line 186 directs air under pressure to the solenoid-operated valve 229 for the air solenoid operated cylinder 190 which retains the sewing machine presser foot in the elevated position. The line 185 directs air under pressure to the solenoid-operated valve 230 for the air-solenoid operated cylinder 189 which commences the "start sew" operation that will be described hereafter in the electrical sequence that follows.

(e) Electrical system

Figure 6:
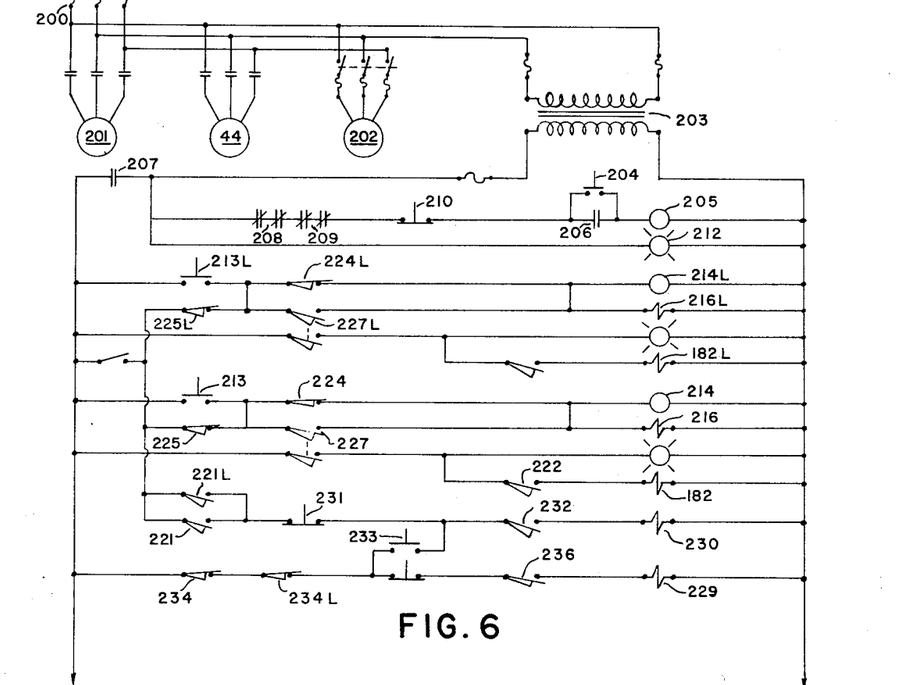
FIG. 6 is a schematic electrical diagram of the end finishing apparatus.

The electrical operation may best be considered with the schematic wiring diagram of FIG. 6 taken in conjunction with FIGS. 1 through 4 and 7 wherein certain electrical components and actuating switches will bear corresponding reference characters on the apparatus and schematic diagram, however, certain components illustrated in the schematic diagram may not be shown specifically on the apparatus figures. A three-phase voltage source 200 supplies current to the right section gear motor 44 and left section gear motor 201, and the sewing machine motor 202. A single phase transformer 203 is connected across two phases of the voltage source to provide single phase power for the operation of the machine control relays and switches. The control circuit has an emergency stop circuit which may be automatically or manually actuated. Power is supplied for operation by depressing the reset switch 204 which energizes the emergency stop relay 205 causing closure of normally open contacts 206 and 207 in this relay. Contact 206 provides a holding circuit for continuing energization of relay 205 until an emergency occurs that will open this circuit terminating power delivery to the balance of the circuit. Normally closed contacts 208 and 209 associated with drive motors 44 and 201 are in series in the emergency stop relay circuit so that any overloading of either of these motors will open the normally closed contacts to terminate current supply. A manually operable emergency switch 210 is mounted on the switch panel 211 adjacent the reset switch 204 on the right side section readily accessible to an operator. A reset pilot light 212 indicates energization of the emergency stop relay. Contact 207 of relay 205 will be closed upon energization of relay 205 and power will be supplied to the various cam, limit and solenoid-operated switches.

As the right section 20 has been described in detail previously, this description will continue for this section primarily although a similar circuit, components and actuating members are employed in the left section and will bear the same reference characters except with the designation "L" appearing after the corresponding reference character for the same components.

A preferred operational sequence of the right section 20 is as follows:

(1) An operator places a waistband 11 secured to a supported garment 10 so that the free terminal end portion 12 is impaled on the impaling tongue member 23.

(2) The operator then momentarily depresses start switch 213 (the emergency stop relay 205 having been energized and the apparatus being in the "home" position as indicated in FIGS. 1 through 4, and 9a to commence a cycle). Depressing start switch 213 momentarily energizes starter 214 and brake 216 to start right section motor 44 that will drive the right section cam shaft 35 causing switch actuator 217 to rotate away from its corresponding switch 225 supported on switch post 223 mounted on the machine frame.

(3) Switch 225 closes and remains closed until the cam shaft 35 returns to the "home" position. When switch 225 closes and remains closed, control power is supplied to motor starter 214 and brake 216 through switches 224 and 227 on the frame mounting post 226 which are in parallel to continue the cycle.

(4) Switch actuator 218 on shaft 35 actuates switch 224 after the cam shaft 35 has rotated to approximately that portion of the cycle shown in FIGS. 9f or 9g. In the event the last waistband terminal free end that has been inverted and placed in the sewing instrumentalities has been sewn and the presser foot (not shown) of the sewing machine automatically raised, then switch 227 will be activated and the circuit to motor starter 214 and brake 216 is uninterrupted. If for any reason the sewing operation has not been completed and it would not be practical to place the next waistband being processed into the sewing instrumentalities, switch 227 will be in its normally open position, and will allow switch 224 to interrupt the flow of current to motor starter 214 and brake 216 stopping motor 44 and preventing it from starting until the sewing operation then functioning to be completed and the presser foot of the sewing machine is raised to operate switch 227 and restart motor 14.

(5) Switch actuator 219 on shaft 35 actuates switch 222 momentarily to energize solenoid valve 182 momentarily admitting air under pressure to activate cylinder 171 which will displace the piston rod clevis joint 170 and linkage 169 to pivot ejector arm 165 on which a garment is draped to eject and stack the previously sewn waistband and depending garment. Continuation of the cycle through continued operation of motor 44 which drives cam shaft 35 positions the inverted waistband 11 on the garment 10 against stripper 163 and causes at least partial removal of tongue member 23 from the inverted terminal free end 14 of the waistband 11 to insure waistband positioning prior to operation of switch 234 by switch actuator 220 on shaft 35 to interrupt current to solenoid valve 229 to cause the presser foot to be lowered upon the waistband prior to complete withdrawal of tongue member 23. The arcuate switch actuator 220 for switch 234 maintains the interruption of current to solenoid valve 229 until the tongue member 23 is completely withdrawn and switch actuator 235 on shaft 35 operates switch 221 momentarily to energize solenoid valve 230 momentarily which in turn triggers the automatic sewing machine 21.

The left section 19 circuitry is identical to the circuitry described for the right-hand section. There is also provided in the circuitry an emergency no-sew switch 231 which enables an operator to prevent automatic starting of the sewing machine without stopping the automatic cycle. A switch 236 is held open by a portion of the automatic sewing machine linkage (not shown) during sewing to maintain the presser foot in the lowered position during sewing. Switch 236 is closed when the sewing operation is completed to energize solenoid valve 229 to raise the presser foot of the sewing machine 21. A switch 232 is physically mounted adjacent the presser foot on the sewing machine to be actuated when the presser foot is in the lowered position to prevent starting the automatic sewing machine with the presser foot in the elevated position. A manually operable sew switch 233 is provided to permit selective or manual operation for set-up and maintenance as opposed to full normal operation. Sew switch 233 may be operated independently of the motors 44 and 201 to deenergize solenoid valve 229 permitting the presser foot to be lowered and the solenoid valve 230 energized.

In the operating sequence for the various movements which will be expressed in degrees of rotation of the various cams or cam shafts, the rotation will be understood to be within the range of the degrees of rotation as opposed to being confined throughut the entire specified range.

In operating sequence from the "home" position after a waistband is placed on the impaling tongue member 23 and the cycle commences, the clamping jaws 48 and 49 are activated from zero to 60 degrees rotation of the cam shaft 35 to accomplish the movements shown in FIGS. 9a and 9b. Gripping action of the clamping jaws 48 and 49 may commence from approximately 15 degrees to 135 degrees of cam shaft rotation as shown in FIGS. 9c through 9f. The retraction and projection of the impaling tongue member 23 occurs from approximately 30 degrees to 150 degrees as shown in FIGS. 9d through 9f, and the inverting mechanism initiates and completes its cycle from 45 degrees to 105 degrees as shown in FIGS. 9d through 9f. A complete cycle of the carriage 115 occurs from 150 degrees to 360 degrees as shown in FIGS. 9g through 9k. Rotation of the housing 24 will occur between 165 to 285 degrees, and the housing will be displaced from 195 degrees to approximately 330 degrees. It is recognized that it is desirable for one sequence of operation to be completed before another sequence of operation commences.

The electrical circuit after a cycle commences will reach the safety stop switch position between 120 and 135 degrees with the presser foot solenoid 229 being actuated to close the valve and depressurize cylinder 190 at from 210 degrees through 255 degrees and the start-new function commencing at from 255 through 270 degrees assuming that the tongue member 23 is fully withdrawn from the waistband with the sewing operation taking place from 270 degrees through 325 degrees, and the ejector mechanism will displace the finished garment from 330 to 345 degrees before the cam shaft and the actuated mechanisms return to the "home" position from 345 degrees to 360 degrees.

(f) Sequential operation

The sequence of operations through a single cycle from the "home" position may best be explained in the schematic illustrations shown in FIGS. 9a through 9k. A waistband 11 with its free terminal end portion 12 and a depending garment 13 is placed on the impaling tongue member 23 with the end of the waistband abutting against the back stop 239. The operator will actuate the right start switch 213 thereby activating motor 44 which will rotate cam shaft 35. The upper jaw actuating cam 70 through its related linkages will urge member 62 to pivot the jaws 48 and 49 inwardly as shown in FIG. 9b. After the jaws are pivoted inwardly to engage the sides 80 and 81 of the waistband 11, in spaced relation to the free end of the waistband, the slidable jaws 50 and 51 will be displaced by the lower jaw actuating cam 79 and its connected linkages will displace the lower jaws toward the upper jaws 56 to releasably clamp or grip a portion of the waistband fabric in the jaws on opposite fabric sides. The impaling tongue member 23 will be partially retracted from its projected position by means of the impaling tongue actuating cam 34 and its related linkages while the actuating cam 70 for the member 62 will pivot the jaws outwardly as tongue member 23 is completely retracted as shown in FIG. 9d. The inverter blades 87 will be actuated by the blade actuating cam 103 and its related linkages to engage the spread fabric and invert the free terminal end portion 12 into the waistband 11 as shown in FIG. 9e before returning tongue member 23 into the turned waistband 11 as shown in FIG. 9f. After the waistband is inverted as shown in FIG. 9f, the clamping and spreading jaws will be relased as shown in FIG. 9g while the waistband 11 is retained on the tongue member 23. Upon completion of the inverting cycle, the pivotable carriage assembly 115 will be actuated through the carriage actuating cam 126 and its related linkages to pivot the carriage assembly 115 downwardly urging plunger 111 to pivot the housing 24 and the supporting tongue member 23 downwardly while supporting a waistband thereon. The slidable carriage 140 will be displaced in a rectilinear direction upon actuation of the cam 154 and its connected linkages to transfer the tongue member 23 with the waistband and garment from the position shown in FIG. 9g to the positions shown sequentially in FIGS. 9h, 9i and 9j, thereby conveying a turned waistband 11 to the sewing machine platform 161 for positioning the waistband and tongue member 23 in juxtaposition to the stripping members 162 and 163 after which the tongue member 23 will be withdrawn as shown in FIG. 9k. Assuming that either no previously positioned garment is in the sewing machine or the ejector arm 165 has functioned to remove a previous garment, the automatic operation will continue as described above in the electrical sequence of operations.

It will be readily apparent that mechanical linkages may be replaced by other driving mechanisms including hydraulically operated mechanisms which will achieve the same or substantially the same functions and results without departing from the purpose and spirit of this invention.

What I claim is:

1. An automatically, sequentially operated apparatus for inverting a tubular portion of a garment waistband having fabric plies opposite each other and an open terminal free end portion comprising automatically actuated means for initially releasably clamping and spreading the fabric plies of the waistband in spaced relation to the open terminal free end portion thereof, and automatically actuated means for thereafter inverting the open terminal free end portion of the waistband into the spread waistband thereby forming a finished inturned edge.

2. An apparatus as claimed in claim 1, and a waistband impaling tongue means for supporting said waistband and said waistband open terminal end portion thereon in juxtaposition to said fabric clamping and spreading means.

3. An apparatus as claimed in claim 2, including a sewing machine having sewing instrumentalities, means in juxtaposition to said sewing machine for releasably supporting said waistband, means for positioning a finished inturned edge waistband on said supporting means, and means for automatically actuating said sewing machine for said waistband finished inturned edge.

4. An apparatus as claimed in claim 2, a sewing machine having sewing instrumentalities in spaced relation to said waistband impaling tongue means, and means for displacing said impaling tongue means with said inturned edge waistband thereon along a directed path of travel to said sewing machine for sewing said waistband inturned edge.

5. An apparatus as claimed in claim 4, and means in juxtaposition to said sewing machine for stripping and releasably supporting said waistband for sewing by said sewing machine.

6. An apparatus as claimed in claim 2, said clamping and spreading means comprising a pair of fabric clamps mounted to cooperate with said impaling tongue means for sequentially moving from out of engagement into engagement with opposite sides of the waistband supported on the impaling tongue means, gripping said fabric at a predetermined position, and spreading the waistband open to receive said inverting means and said free end portion of said waistband.

7. An apparatus as claimed in claim 2, said inverting means comprising plunger means adjacent said impaling tongue means for engaging the open free terminal end of the waistband and tucking said end into the waistband.

8. An apparatus as claimed in claim 7, said waistband impaling tongue means being movable from the waistband-receiving position to a waistband-stripping position, means for moving said impaling tongue means from said waistband-receiving to said waistband-stripping position, said clamping and spreading means including a pair of clamps, one on each side of said impaling means for engaging and spreading said waistband open in spaced relation to the open terminal free end of said waistband, said inverting means including a pair of plunger members for engaging the open terminal free end of the waistband on opposite sides of said impaling means for inverting the open terminal free ends of the waistband and positioning it into the waistband to form a finished inturned edge, means for withdrawing said impaling tongue means from said waistband, at least partially, before completion of inverting the open terminal free end into the waistband and inserting said impaling tongue means upon inverting the open terminal free end, a sewing machine having means thereon for releasably engaging and supporting said waistband in a predetermined aligned position in the path of said impaling tongue means forming said waistband-stripping position, means for removing said impaling tongue means upon positioning of said waistband on said sewing machine waistband supporting means, and means for automatically actuating said sewing machine for sewing said waistband finished terminal inturned edge.

9. A method of end finishing a garment waistband comprising the steps of drawing the free terminal end of a garment tubular waistband and waistband onto a supporting member, gripping opposed outside portions of the supported waistband in spaced relation to the waistband free terminal end, and tucking the free terminal end beyond said gripped outside portions of the waistband into itself.

10. A method as claimed in claim 9, further including positioning the supported waistband for end sewing on a sewing machine, at least partially removing the supporting member from the waistband prior to sewing the inturned waistband on the sewing machine, and sewing the open end of the waistband closed.

11. A method as claimed in claim 10 including the step of displacing the supported member with the supported waistband thereon along a predetermined path of travel for positioning on said sewing machine.

References Cited

UNITED STATES PATENTS

| | | | |
|---|---|---|---|
| 863,215 | 8/1907 | Pinkham | 223—42 |
| 1,581,983 | 4/1926 | Rood | 223—42 |
| 1,857,944 | 5/1932 | Dember et al. | 112—63 |
| 2,426,285 | 8/1947 | Sigoda et al. | 112—63 |
| 2,726,611 | 12/1955 | Cloutier | 112—63 |
| 3,310,207 | 3/1967 | Gore | 112—10 XR |

H. HAMPTON HUNTER, Primary Examiner

U.S. Cl. X.R.

223—43